(12) United States Patent
Lin (10) Patent No.: US 11,499,670 B2
(45) Date of Patent: Nov. 15, 2022

(54) FIXING MECHANISM FOR LIFTING DEVICE

(71) Applicant: TIMOTION TECHNOLOGY CO., LTD., New Taipei (TW)

(72) Inventor: Yu-Chang Lin, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 217 days.

(21) Appl. No.: 17/139,941

(22) Filed: Dec. 31, 2020

(65) Prior Publication Data

US 2022/0170588 A1 Jun. 2, 2022

(30) Foreign Application Priority Data

Nov. 27, 2020 (TW) .................. 109215686

(51) Int. Cl.
| | |
|---|---|
| *F16M 1/00* | (2006.01) |
| *F16M 13/02* | (2006.01) |
| *F16D 3/12* | (2006.01) |
| *A47B 9/20* | (2006.01) |

(52) U.S. Cl.
CPC .............. *F16M 13/02* (2013.01); *F16D 3/12* (2013.01); *A47B 9/20* (2013.01); *A47B 2200/0051* (2013.01); *F16D 2300/22* (2013.01)

(58) Field of Classification Search
CPC ....... F16M 13/02; F16D 3/12; F16D 2300/22; A47B 9/20
USPC ............................................ 248/638
See application file for complete search history.

(56) References Cited

U.S. PATENT DOCUMENTS

| | | | |
|---|---|---|---|
| 9,447,915 B1* | 9/2016 | Morgan ................. | F16M 11/24 |
| 11,359,694 B2* | 6/2022 | Tomita .................... | F16F 15/30 |
| 2015/0285431 A1* | 10/2015 | Slusher, II ............. | A47C 23/30 |
| | | | 267/86 |
| 2019/0345986 A1* | 11/2019 | Isobe ....................... | F16D 3/79 |

* cited by examiner

*Primary Examiner* — Todd M Epps
(74) *Attorney, Agent, or Firm* — Chun-Ming Shih; HDLS IPR Services (57) ABSTRACT

A fixing mechanism for a lifting device is provided. The lifting device includes a motor and a transmission shaft driven by the motor. The fixing mechanism includes a support body, a fixing assembly, a bearing, and a connection assembly. The fixing assembly includes a base plate fixed above the support body and a chamber disposed between the base plate and the support body. A bearing is arranged in the chamber and clamped between the support body and the base plate, and the transmission shaft passes through the bearing and protrudes from the base plate. The connection assembly is sleeved on the transmission shaft to together connect with the motor. Accordingly, power transmission efficiency may be improved, and vibration and noise generated during operation of the motor may be reduced.

10 Claims, 9 Drawing Sheets

FIXING MECHANISM FOR LIFTING DEVICE

BACKGROUND

Technical Field

This disclosure relates to a lifting device and in particular, to a fixing mechanism of a lifting device.

Related Art

Nowadays, many furniture or machines have a function of lifting or changing angles, so that users can adjust to the best angle and posture according to personal preference. To achieve this purpose, a commonly used structure uses a motor to drive a transmission mechanism through a coupling. A screw rod is rotated to change the height or angle of a furniture and a machine table.

Generally, in installation of the motor, the motor is directly fastened by screws to limit axial and radial vibration generated when the motor is in operation, and rubber washers are used as a buffer when a fixing plate of a bearing is fastened. However, this may cause vibration generated by the motor to be directly transmitted to other parts through the screws and produce noise. Also, when the motor is turned on and operates, an axial gap generated by the deformation of the rubber washer may cause the motor to move up and down and some of the driving power of the motor may be lost, which is a problem that needs to be improved.

In view of the above-mentioned shortcomings of the conventional technique, the inventor of this disclosure made a lot of research and studies to solve the above-mentioned problems.

SUMMARY

The main purpose of this disclosure is to improve power transmission efficiency, reduce vibration and noise generated by a motor during operation through changing a fixing method for the motor.

Accordingly, this disclosure provides a fixing mechanism for a lifting device. The lifting device includes a motor and a transmission shaft driven by a motor. The fixing mechanism includes a support body, a fixing assembly, a bearing, and a connection assembly. The fixing assembly includes a base plate fixed above the support body and a chamber disposed between the base plate and the support body. A bearing is arranged in the chamber and clamped between the support body and the base plate, and the transmission shaft passes through the bearing and protrudes from the base plate. The connection assembly is disposed on the transmission shaft and connected to the motor together with the transmission shaft.

This disclosure also provides the following functions. The base plate may be fastened to the support body through each fixing hole and each screw hole, and the bearing may be tightly clamped between the base plate and the support body without shaking. The motor may be fixed on the base plate by the shock-reducing sleeve with each hook arm engaging to each fastening slot to reduce vibration generated during operation of the motor. The motor may drive the power output slot to rotate the shock-absorbing sleeve and the coupling during operation through a coupling, a shock-absorbing sleeve, and a power output slot, thereby driving the transmission shaft to rotate.

BRIEF DESCRIPTION OF THE DRAWINGS

The disclosure will become more fully understood from the detailed description and the drawings given herein below for illustration only, and thus does not limit the disclosure, wherein.

DETAILED DESCRIPTION

The detailed description and technical content of this disclosure are provided as follows in conjunction with the accompanying drawings. However, the drawings are only for illustrative purposes and are not intended to limit this disclosure.

Referring to FIGS. 1 to 6, this disclosure provides a fixing mechanism for a lifting device 60. The lifting device 60 includes a motor 61 and a transmission shaft 62 driven by the motor 61. The fixing mechanism is used to fix the motor and includes a support body 10, a fixing assembly 20, a bearing 30, and a connection assembly 40.

The motor 61 is an electric motor in this disclosure. The fixing assembly 20 is used for the installation and positioning of the motor 61 and includes a base plate 21. The base plate 21 is fixed above the support body 10. A chamber 22 is formed between the base plate 21 and the support body 10. The bearing 30 is arranged in the chamber 22 and clamped between the support body 10 and the base plate 21, and the transmission shaft 62 passes through the bearing 30 and protrudes from the base plate 21. The connection assembly 40 is disposed and sleeved on the transmission shaft 62 and connects to (engaged with) the motor 61 together with the transmission shaft 62.

Figure 4:
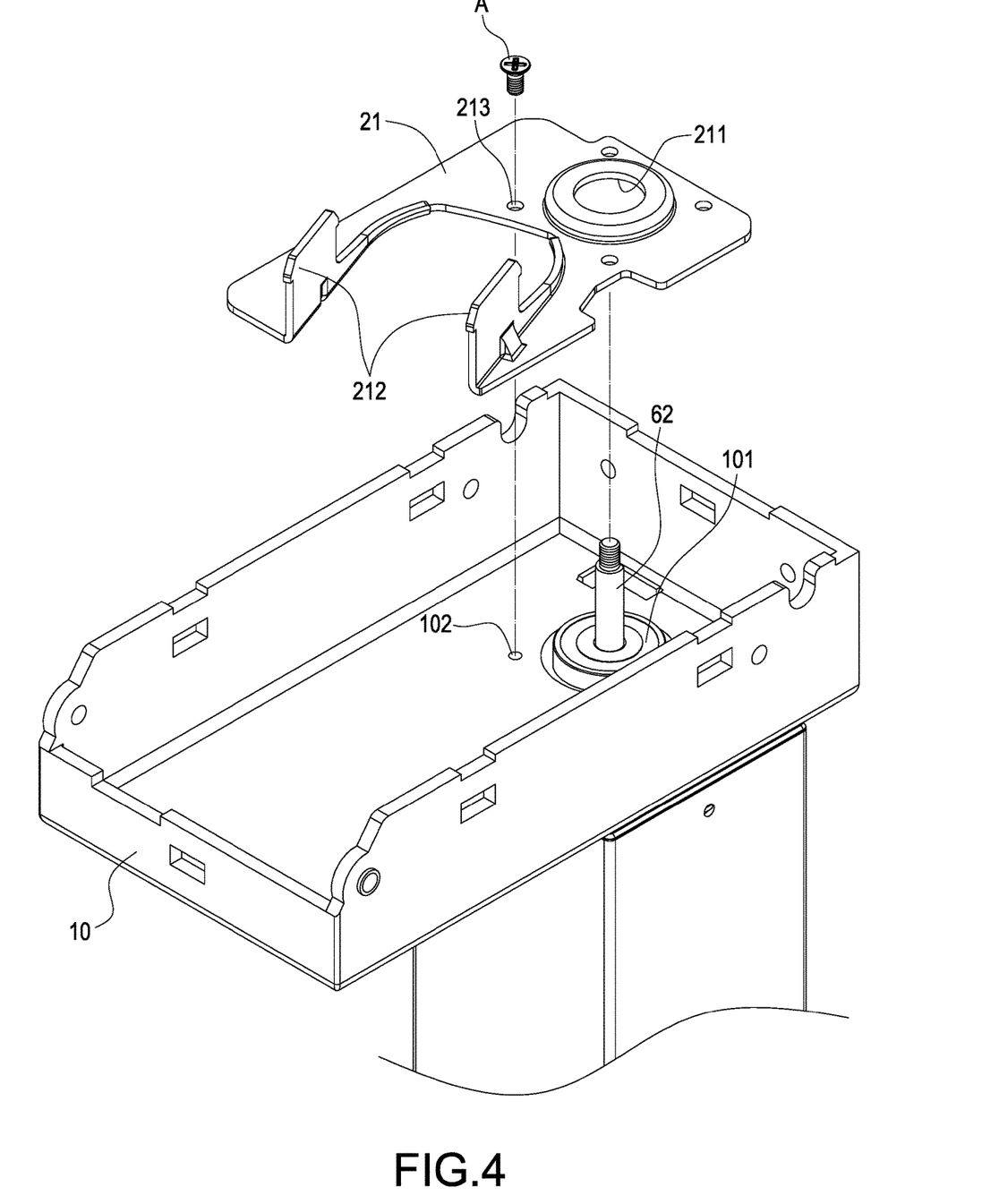
FIG. 4 is a perspective exploded view illustrating a base plate and the lifting device of this disclosure.

Furthermore, a lower recess 101 is formed on the support body 10, an upper recess 211 is formed on the bottom of the base plate 21, the chamber 22 is configured by the upper recess 211 and the lower recess 101, a plurality of screw holes 102 are disposed on the support body 10, a plurality of fixing holes 213 are disposed on the base plate 21, and a screw-fixing element A is inserted to each fixing hole 213 to screwed and connected with each of the screw holes 102. As shown in FIG. 4. as a result, the base plate 21 may be fastened to the support body 10, and the bearing 30 is clamped tightly between base plate 21 and the support body 10 without shaking.

Figure 1:
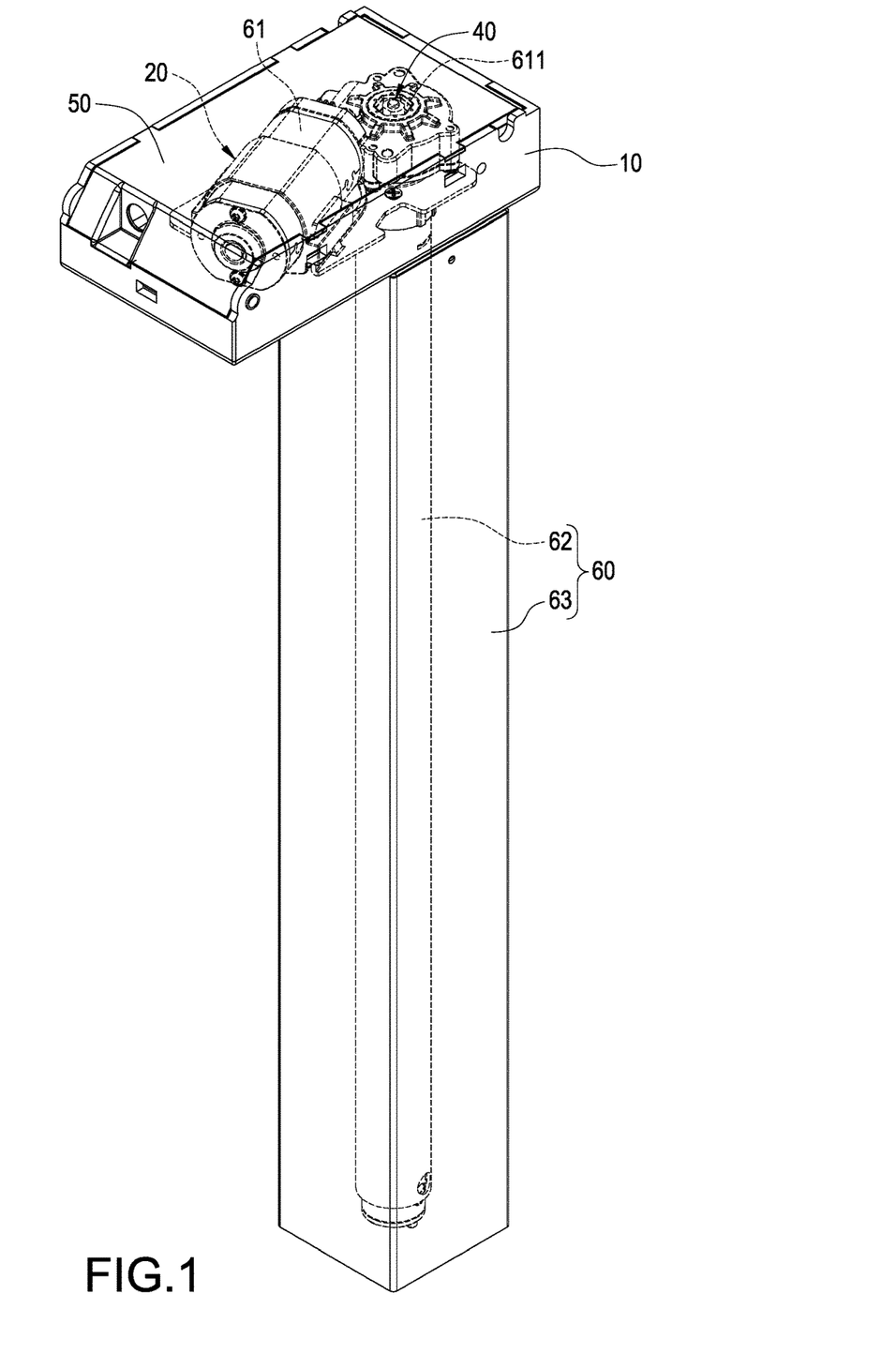
FIG. 1 is a perspective view of this disclosure.
Figure 2:
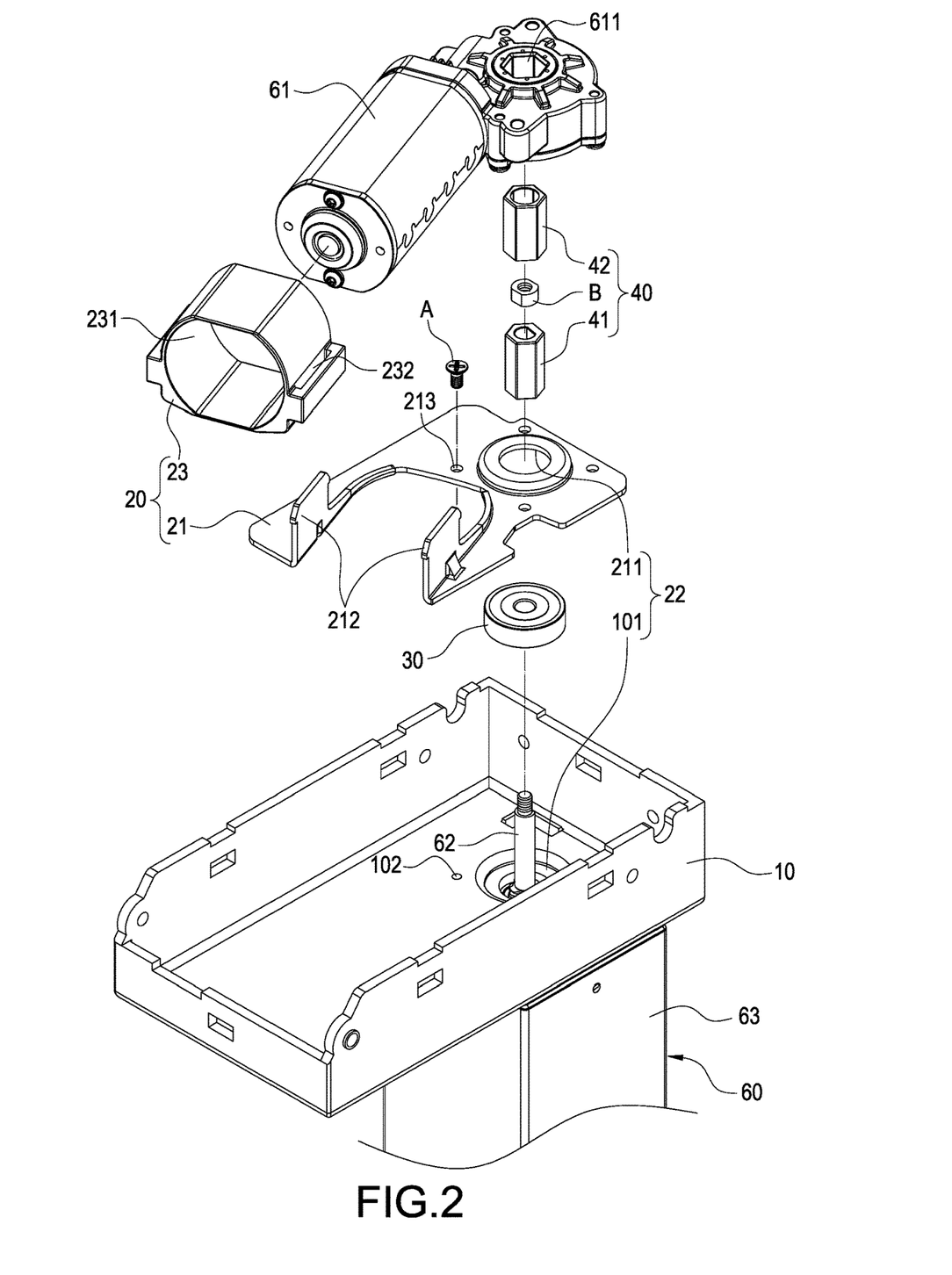
FIG. 2 is a perspective exploded view of this disclosure.
Figure 3:
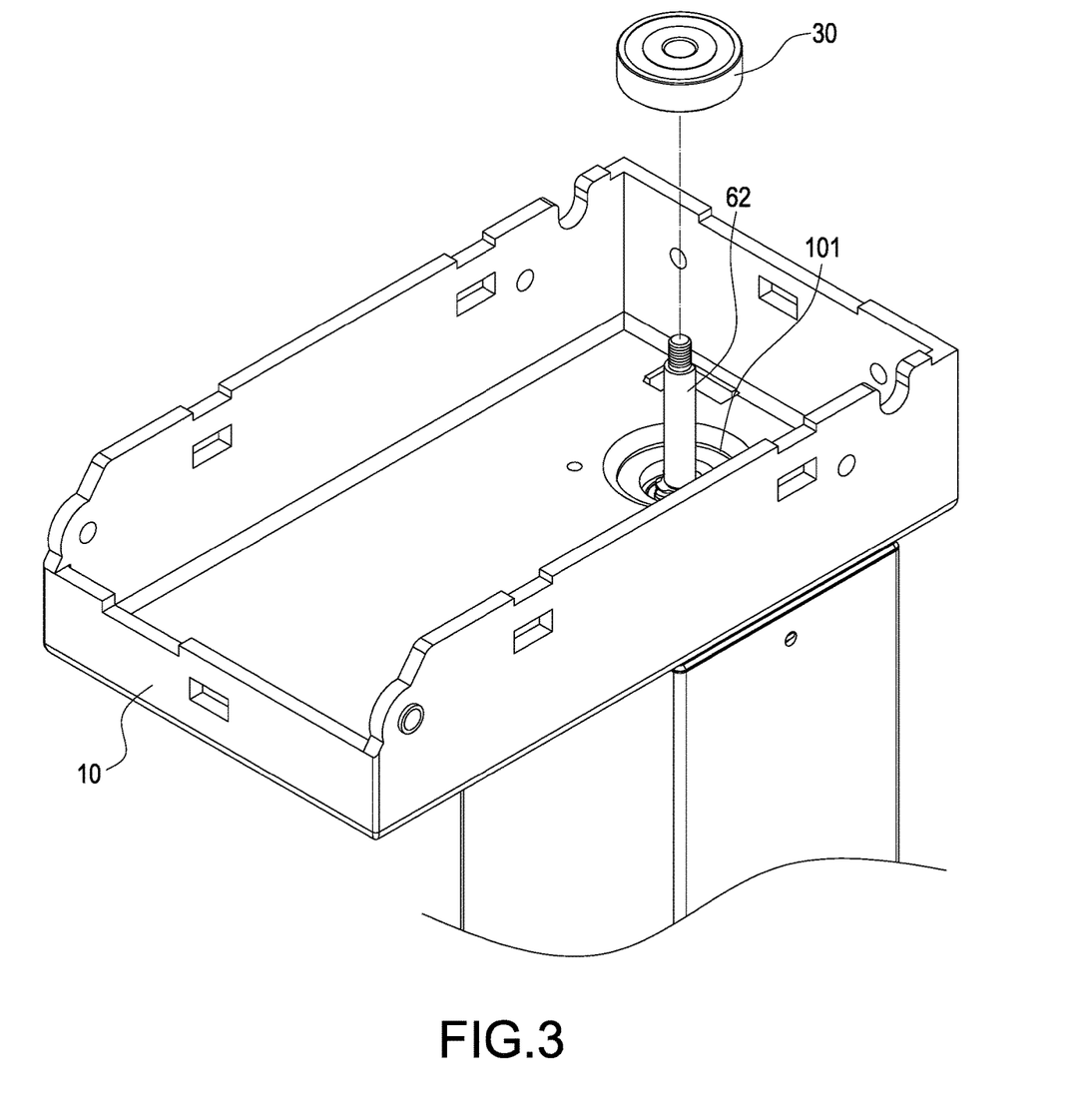
FIG. 3 is a perspective exploded view illustrating a bearing and a lifting device of this disclosure.

As shown in FIGS. 1 and 2, the lifting device 60 further includes a housing 63. The housing 63 surrounds outside of the transmission shaft 62, and is located on the bottom of the support body 10. Thus, the transmission shaft 62 may be protected to prevent dust or sand from entering and affecting operation. The fixing assembly 20 further includes a shock-reducing sleeve 23. The shock-reducing sleeve 23 has a plurality of fastening slots 232 and an accommodating slot 231 accommodating the motor 61. The base plate 21 is protrudingly provided with a plurality of hook arms 212 correspondingly engaged with the fastening slots 232, thereby the motor 61 may be disposed and sleeved in the shock-reducing sleeve 23 to be fastened on the base plate 21. Thus, the motor 61 is fixed to reduce the vibration generated during operation.

Figure 5:
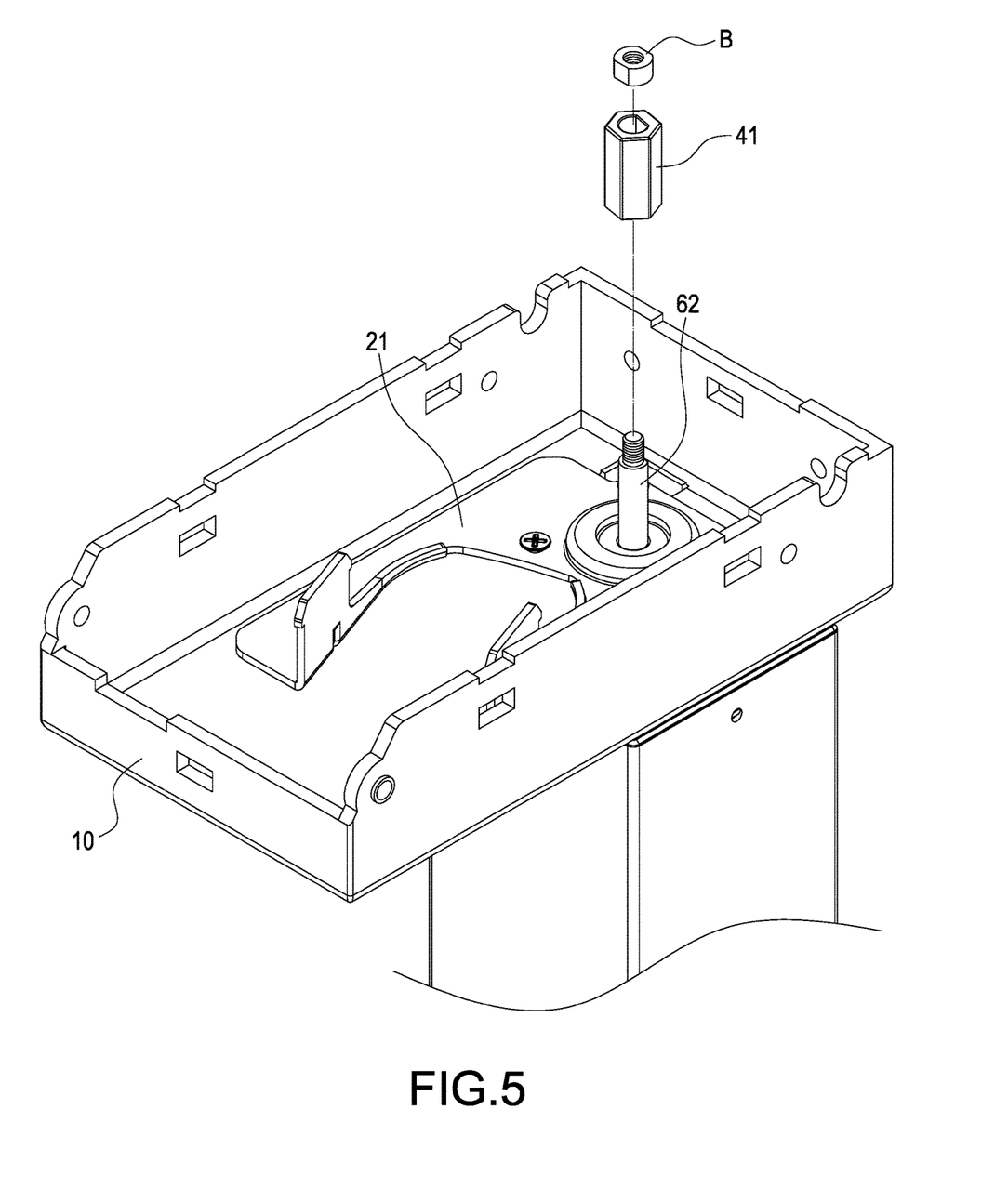
FIG. 5 is a perspective exploded view illustrating a coupling and the lifting device of this disclosure.
Figure 6:
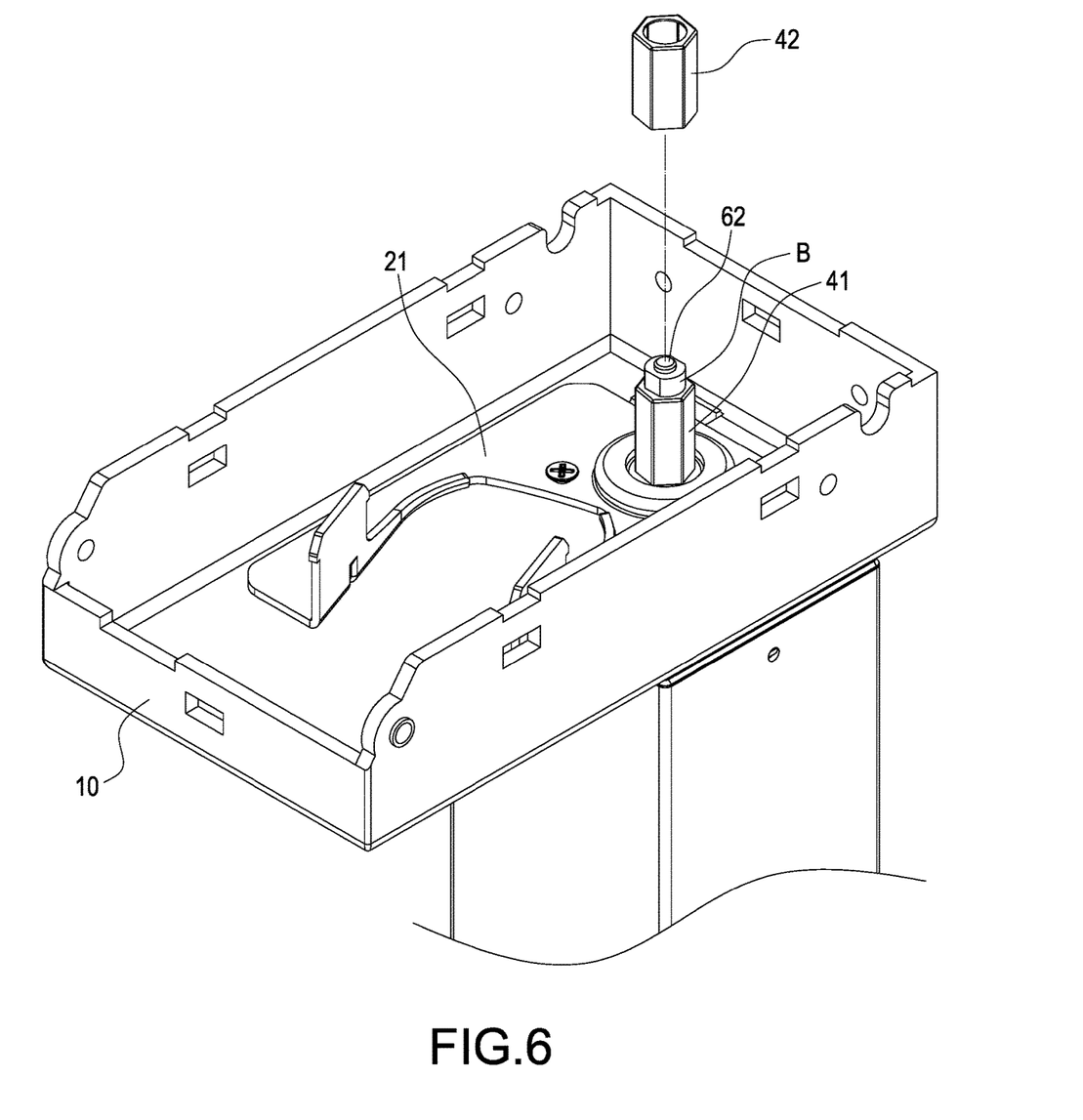
FIG. 6 is a perspective exploded view illustrating a shock-absorbing sleeve and the lifting device of this disclosure.

The motor 61 is provided with a power output slot 611, and the connection assembly 40 includes a coupling 41 and a shock-absorbing sleeve 42. As shown in FIG. 5, the coupling 41 is disposed and sleeved on the transmission shaft 62 and fixed by a screw-fixing element, such as a nut B or other suitable screw-fixing elements. As shown in FIG. 6, the shock-absorbing sleeve 42 is disposed and sleeved on outside of the coupling 41. The power output slot 611 is disposed and sleeved on the shock-absorbing sleeve 42. Therefore, when the motor 61 operates, the power output slot 611 is driven to rotate the shock-absorbing sleeve 42 and the coupling 41, thereby driving the transmission shaft 62 to rotate. In some embodiments, the power output slot 611 is a polygonal slot, the shock-absorbing sleeve 42 is a polygonal shock-absorbing sleeve matching the polygonal slot, and the coupling 41 is a polygonal coupling matching the polygonal shock-absorbing sleeve. In some other embodiments, the polygonal slot, the polygonal shock-absorbing sleeve, and the polygonal coupling used in this disclosure are hexagonal, thereby the motor 61 may drive the transmission shaft 62 to rotate for avoiding a kinetic energy loss during transmission.

In detail, the fixing mechanism for fixing the motor of this disclosure may further include an upper cover plate 50 assembled to cover the support body 10, thereby pressing the motor 61 to avoid vibrating and shaking, and at the same time preventing dust or sand/gravel from entering and contacting the motor 61 to affect the operation.

Figure 7:
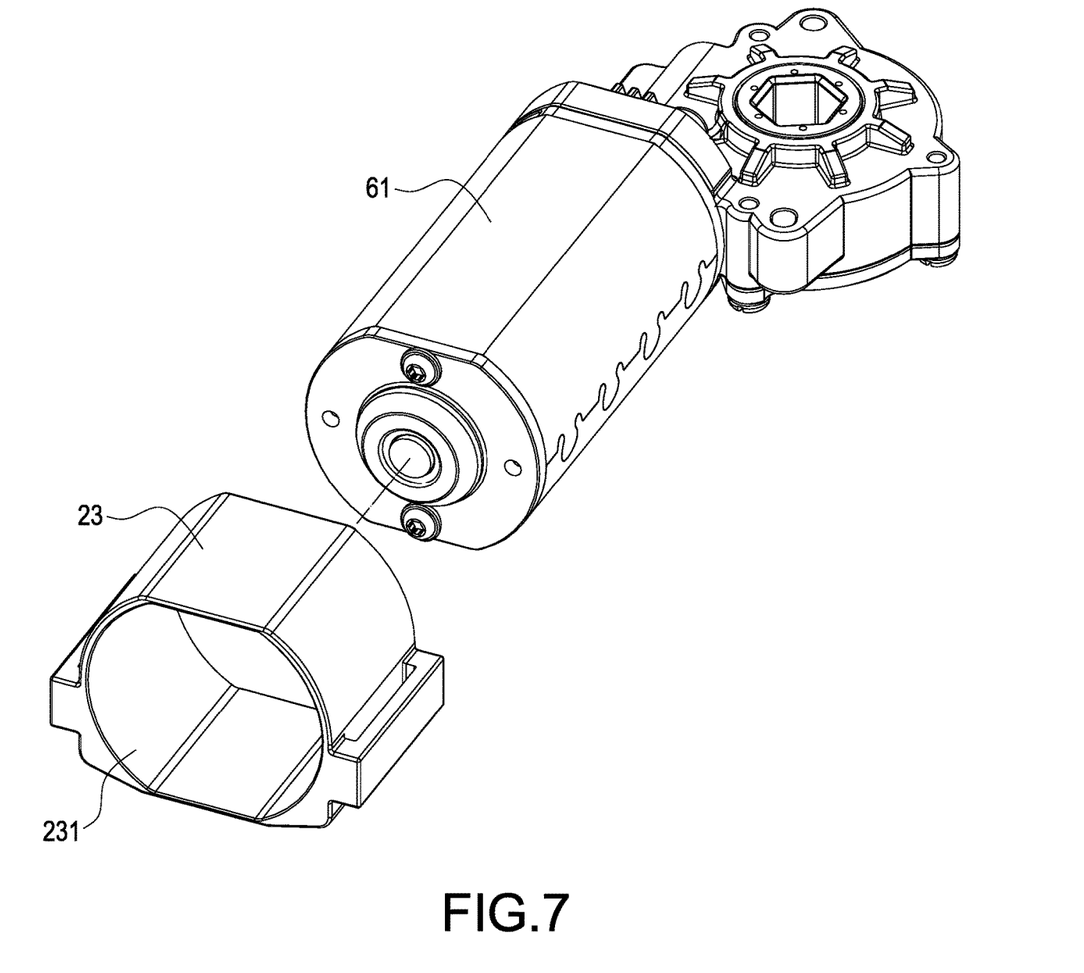
FIGS. 7 to 9 are schematic views illustrating an installation sequence of the motor of this disclosure.
Figure 8:
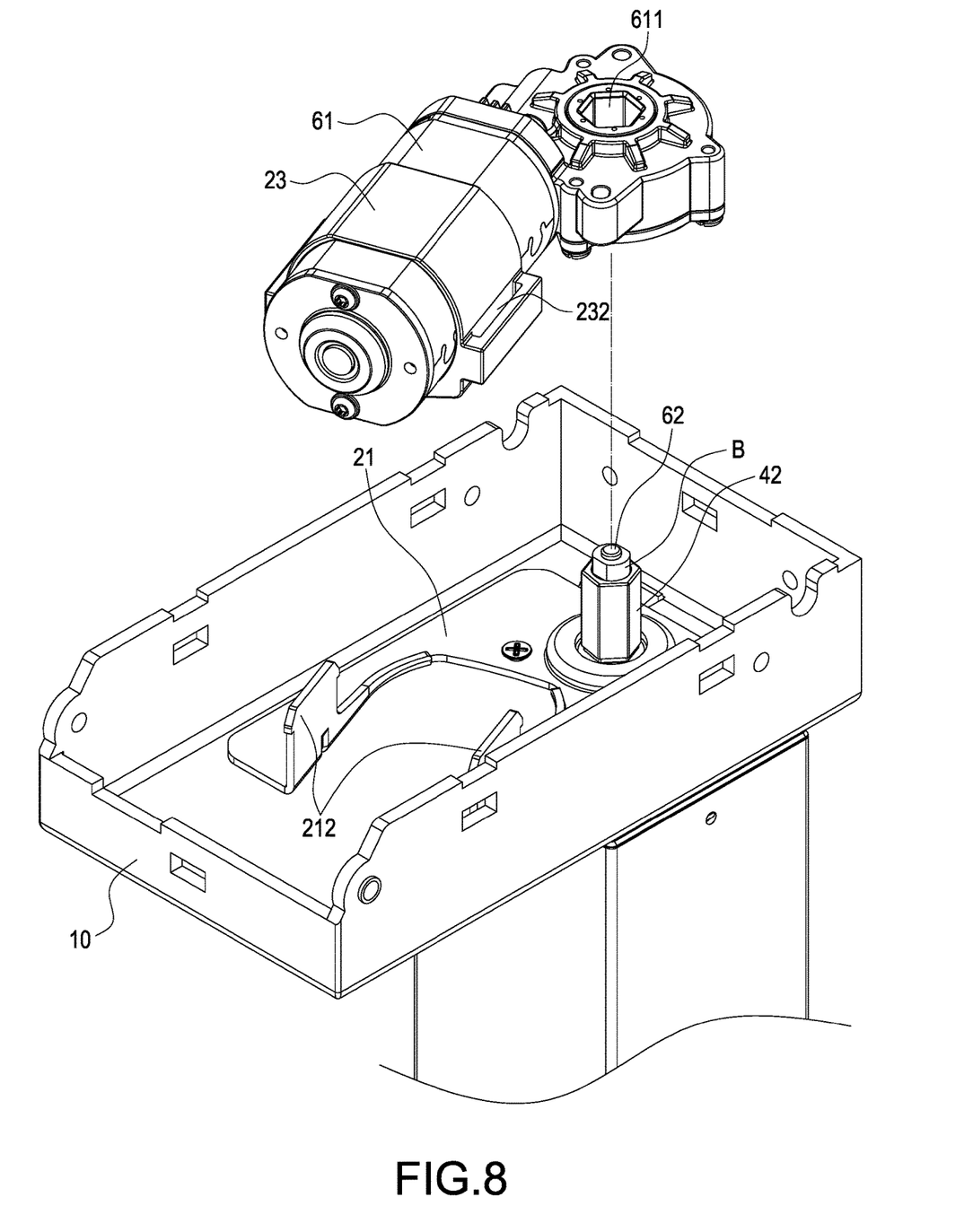
Figure 9:
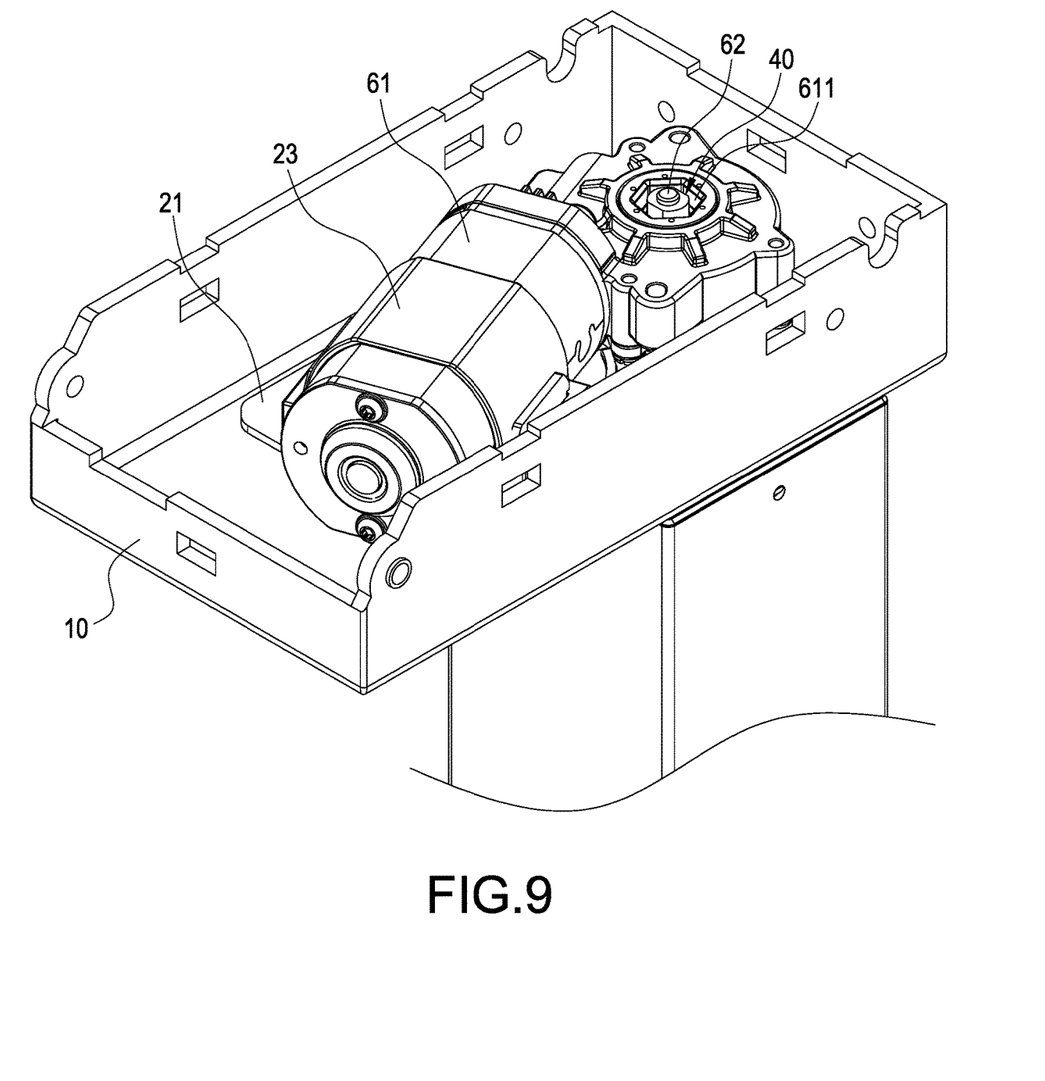

In some embodiments, please refer to FIGS. 7 to 9 which show an installation sequence of the motor 61 of this disclosure. First, as shown in FIG. 7, the motor 61 is disposed in the accommodating slot 231 of the shock-reducing sleeve 23. Next, as shown in FIGS. 8 and 9, the motor 61 and the shock-reducing sleeve 23 are assembled onto the base plate 21, so that the power output slot 611 is disposed and sleeved on the shock-absorbing sleeve 42, and each hook arm 212 is engaged with each fastening slot 232.

Certainly, this disclosure can also have various other embodiments. Without departing from the spirit and essence of this disclosure, those skilled in the art can make various changes and modifications according to this disclosure, but such changes and modifications should be deemed to be within the protection scope of this disclosure.

What is claimed is:

1. A fixing mechanism for a lifting device, the lifting device comprising a motor and a transmission shaft driven by the motor, the fixing mechanism comprising:
    a support body;
    a fixing assembly, comprising a base plate fixed above the support body and a chamber disposed between the base plate and the support body;
    a bearing, arranged in the chamber and clamped between the support body and the base plate, the transmission shaft passing through the bearing and protruding from the base plate; and
    a connection assembly, disposed on the transmission shaft and connected to the motor together with the transmission shaft.

2. The fixing mechanism for the lifting device according to claim 1, wherein a lower recess is disposed on the support body, an upper recess is disposed on the base plate, and the chamber is configured by the upper recess and the lower recess.

3. The fixing mechanism for the lifting device according to claim 1, wherein the fixing assembly is configured for installing and positioning the motor.

4. The fixing mechanism for the lifting device according to claim 3, further comprising an upper cover plate assembled to cover the support body.

5. The fixing mechanism for the lifting device according to claim 3, wherein a plurality of screw holes is disposed on the support body, a plurality of fixing holes is disposed on the base plate, and a screw-fixing element is inserted to each of the fixing holes to connect with each of the screw holes.

6. The fixing mechanism for the lifting device according to claim 3, wherein the fixing assembly further comprises a shock-reducing sleeve comprising an accommodating slot, and the motor is disposed in the accommodating slot.

7. The fixing mechanism for the lifting device according to claim 6, wherein the shock-reducing sleeve comprises a plurality of fastening slots, and the base plate comprises a plurality of hook arms engaged correspondingly with the fastening slots.

8. The fixing mechanism for the lifting device according to claim 3, wherein the connection assembly comprises a coupling and a shock-absorbing sleeve, the coupling is disposed on the transmission shaft, and the shock-absorbing sleeve is disposed on the coupling.

9. The fixing mechanism for the lifting device according to claim 8, wherein the motor comprises a power output slot inserted by the shock-absorbing sleeve.

10. The fixing mechanism for the lifting device according to claim 9, wherein the power output slot comprises a polygonal slot, the shock-absorbing sleeve comprises a polygonal shock-absorbing sleeve corresponding to the polygonal slot, and the coupling comprises a polygonal coupling corresponding to the polygonal shock-absorbing sleeve.

* * * * *